Figure 1:
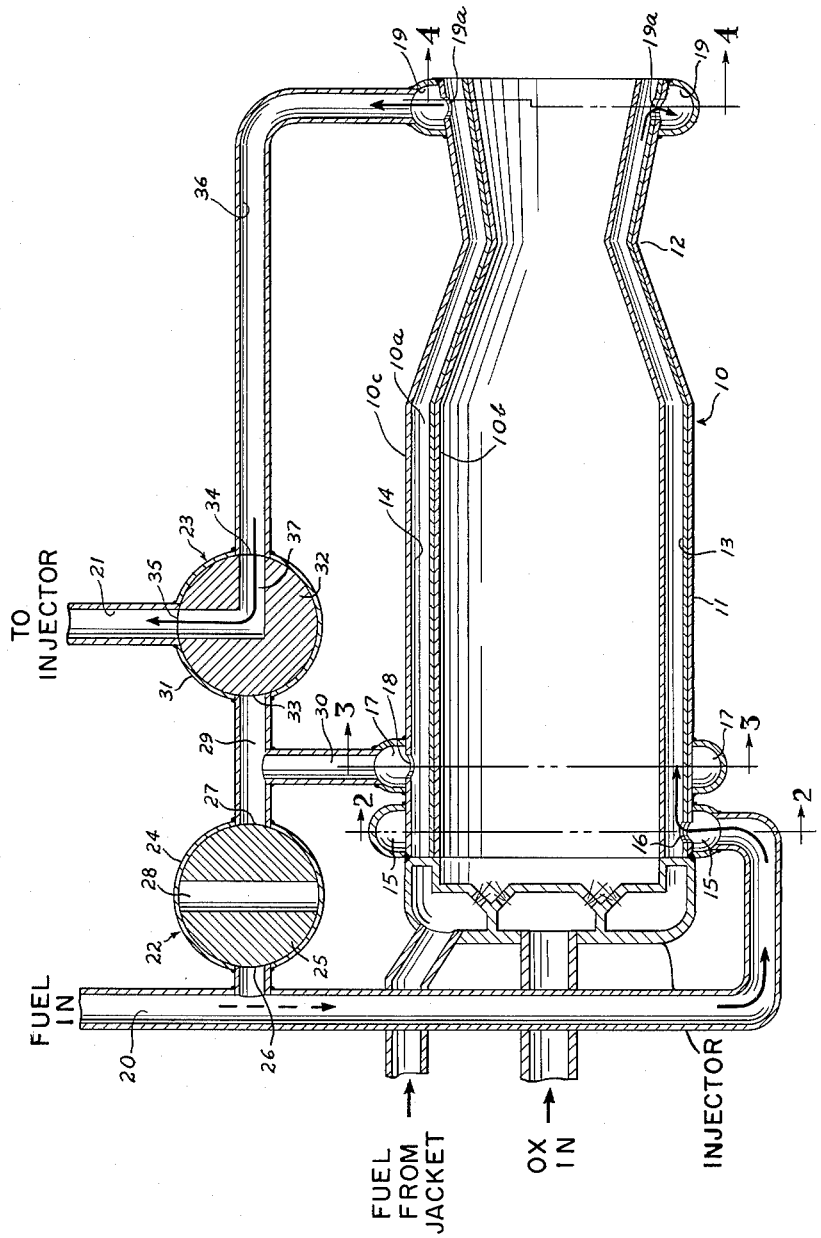

March 21, 1961     Z. FOX     2,975,592
ROCKET THRUST CHAMBER

Filed June 11, 1958     3 Sheets-Sheet 1

INVENTOR.
ZOLA FOX
BY William R. Wright

March 21, 1961 Z. FOX 2,975,592
ROCKET THRUST CHAMBER
Filed June 11, 1958 3 Sheets-Sheet 2

INVENTOR.
ZOLA FOX
BY

March 21, 1961    Z. FOX    2,975,592
ROCKET THRUST CHAMBER
Filed June 11, 1958    3 Sheets-Sheet 3

INVENTOR.
ZOLA FOX
BY William R. Wright

United States Patent Office 2,975,592
Patented Mar. 21, 1961

2,975,592
ROCKET THRUST CHAMBER
Zola Fox, Verona, N.J., assignor to Thiokol Chemical Corporation, Trenton, N.J., a corporation of Delaware
Filed June 11, 1958, Ser. No. 741,317
2 Claims. (Cl. 60—35.6)

The invention relates in general to hydraulic cooling jackets for the thrust chambers of jet propulsion devices and has particular reference to means for selective control of jacket pressure drop in variable thrust engines.

It is well known in the art that a cooling jacket should be designed so that the coolant pressure drop will be a minimum. In the thrust chamber jackets of engines that operate at constant low thrust (and hence low coolant mass flow rate) this is accomplished by determination of the most suitable coolant passageway geometry. Unfortunately, however, jacket design in variable thrust engines usually has been influenced by cooling considerations at low thrust, and the requirements for low thrust cooling, in turn, penalize engine design by calling for high jacket pressure drop at elevated thrust (and hence proportionately high coolant flow rate).

The results of unfortunate adherence to non-variable coolant passageway geometry in variable thrust engines is exemplified in the following table (where a given ratio of high to low thrust of only 3 to 1 is accompanied by a change in coolant pressure drop of 9 to 1).

|  | Flow Rate | Jacket Pressure Drop (P) |
|---|---|---|
|  |  | p.s.i. |
| Low Thrust | 1 × W#/sec. | 30 |
| High Thrust | 3.0 × W | 270 |

Non-variable coolant passageway geometry is represented by the typical axial flow cooling jacket of a conventional thrust chamber wherein plural circumferentially evenly spaced coolant passageways extend longitudinally within the side wall thereof and usually parallel the internal peripheral contour to include the constricted orifice, or throat, of the convergent-divergent nozzle section. Prior to my present invention, it has been the practice to direct the flow of coolant fluid simultaneously through the entire number of available passageways.

In an endeavor to keep jacket pressure drop at a minimum in variable thrust engines when operating at low or high thrust, or even at intermediate thrust, it is the primary object of my present invention to provide means applicable to the conventional thrust chamber cooling jacket by which the cross-sectional area of the coolant passageways may be varied selectively to adapt the same to variable thrust operation.

Another and very important object is to provide coolant passageways area regulating means which is extremely simple and compact in construction and therefore meets the low weight requirements of any mechanical adjuncts to an airborne device such as a jet engine.

Figure 2:
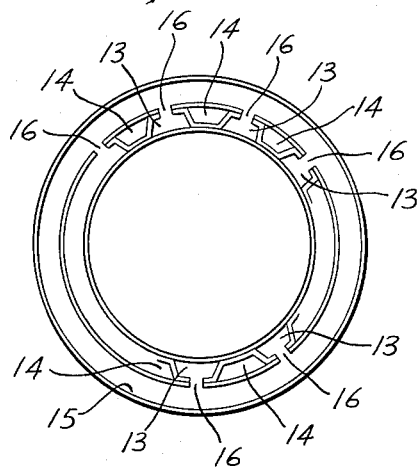
Figure 3:
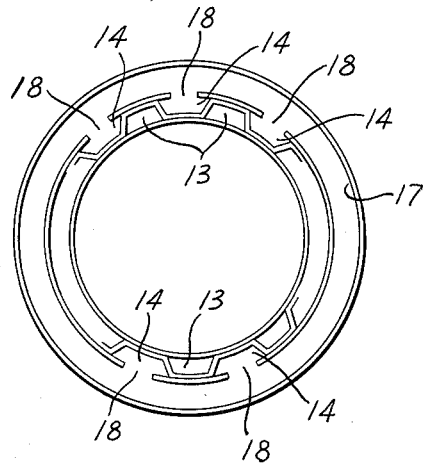
Figure 4:
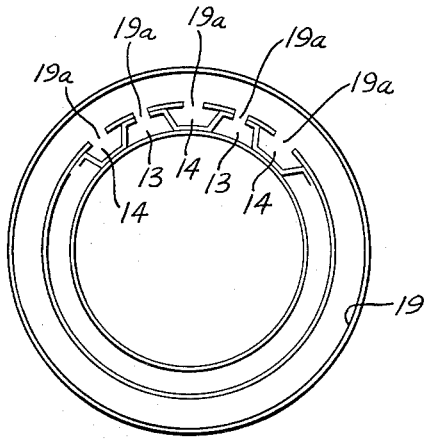

Further objects, advantages and features will become apparent as the following specific description is read in connection with the accompanying drawings, in which:

Fig. 1 is a semi-diagrammatic longitudinal section of a typical coolant-jacketed thrust chamber having selector valve means applied thereto for the purpose of controlling the coolant passageways area in a variable thrust engine, showing the valve means set for low thrust operation; Fig. 2 is a transverse section on line 2—2 of Fig. 1; Fig. 3 is a similar section on line 3—3 of Fig. 1; and Fig. 4 is a similar section on line 4—4 of Fig. 1.

Figure 5:
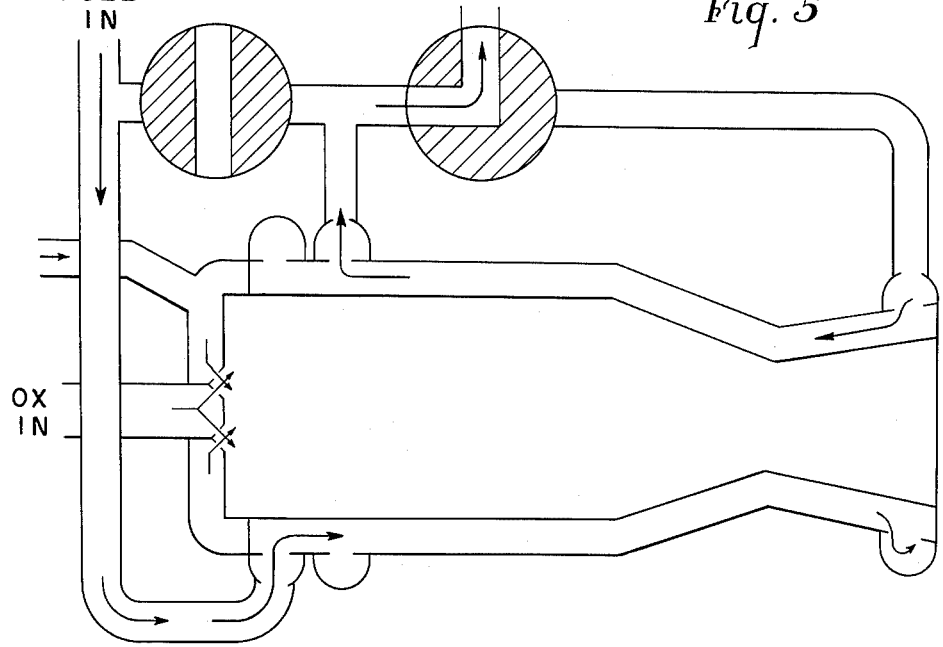
Figure 6:
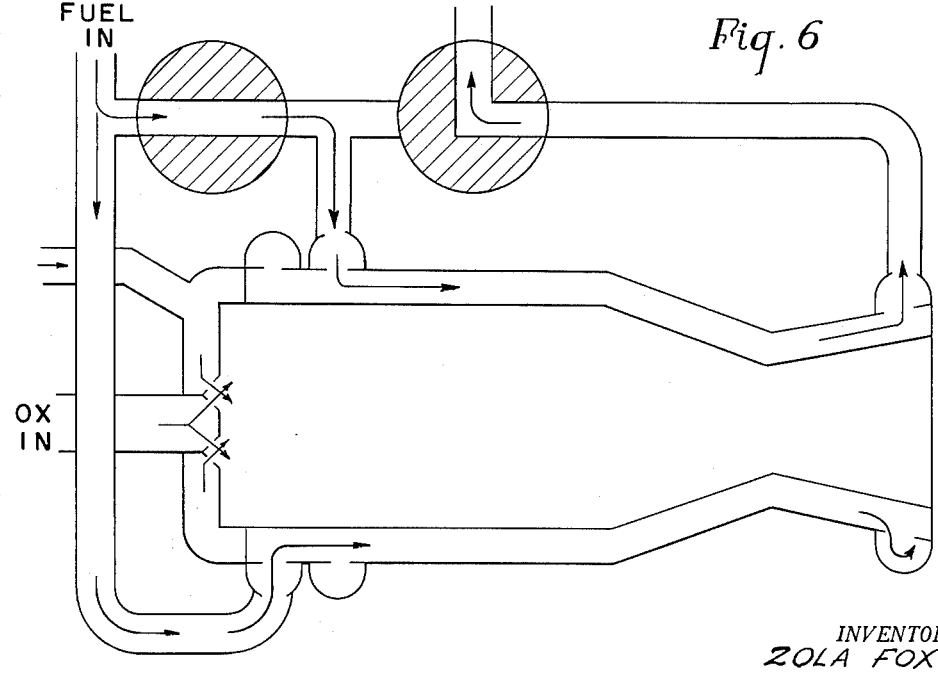

Fig. 5 is a view similar to Fig. 1, showing the selector valve means adjusted for a flow condition corresponding to intermediate thrust operation but wherein heat transfer considerations are of paramount importance; and Fig. 6 is a similar view showing the selector valve means adjusted for high thrust operation.

Referring now in detail to the drawings, wherein like reference characters designate corresponding parts in the several views, it will be observed that the thrust chamber 10 represented in Figs. 1 to 6, inclusive, is of currently conventional construction, to include a cylindrical combustion chamber 11 and a convergent-divergent nozzle 12. It is to be understood that it is within the spirit of the present invention and scope of the appended claims to adapt the novel principle thereof to other thrust chamber designs of the present or future.

The side wall of thrust chamber 10 is provided with plural longitudinal coolant passageways that are uniformly spaced circumferentially and conform to the internal contour of said chamber. These passageways are divided by means to be described presently into a first set of passageways 13 and a second set of passageways 14 which alternate in circumferential arrangement with said first set. In other words, every other passageway is a first set passageway 13 and the intervening ones are second set passageways 14.

The jacket construction shown in Fig. 3 is suggested as being practical, but it is to be understood that I am not limited to any such particular mode of attainment. In accordance with the illustrative structure, a longitudinally corrugated partition 10a intervenes between the respective inner and outer shells 10b and 10c to form the alternate passageways 13 and 14.

Substantially at the upstream end of thrust chamber 10, there is a pair of distinct annular manifolds integral with the side wall thereof. Of these two manifolds, a first upstream manifold 15 has suitably spaced orifices 16 which establish communication with the respective coolant passageways 13 of said first set, and a second upstream manifold 17 has orifices 18 establishing communication with the respective coolant passageways 14 of said second set.

Substantially at the downstream end of thrust chamber 10, there is a common manifold 19 which has suitably spaced orifices 19a establishing communication with the respective coolant passageways 13—14 of both of said first and second sets.

The object of the invention being to vary the cross-sectional area of the passageways in which coolant fluid flows through the thrust chamber jacket to accommodate the effective area to different thrust conditions, viz: low, intermediate and high thrust, this is accomplished with the fixed coolant passageways and manifold structure just described by adding selector valve means to direct the coolant flow in three appropriately different courses. These three selected courses of flow will now be described and description of exemplary selector valve means will follow.

The coolant passageways geometry is so designed that flow of coolant fluid downstreamwardly through the first set of passageways 13 is adequate for the low thrust condition of engine operation. However, for high thrust, I cause coolant fluid to flow downstreamwardly through both of said first and second sets of passageways 13 and 14. Intermediate thrust engine operation may be accommodated by causing the coolant fluid to flow downstreamwardly through said first set of passageways 13 and thence in reverse direction upstreamwardly through said second set of passageways 14.

Before proceeding further with the description of the selector valve means it should be stated that it is within the spirit of the invention and scope of the claims to utilize as coolant fluid either one of the liquid propellants in the case of a regenerative type thrust chamber, or some other fluid such as water.

Regardless of the nature of the particular coolant fluid used, there will be a coolant inlet conduit 20 and a cooperative coolant outlet conduit 21 suitably positioned in relation to thrust chamber 10. Inlet conduit 20 leads directly to, and is in communicative connection with, first upstream manifold 15.

Selector valve means is provided to control coolant fluid flow in passageways 13 and 14. This valve means may take any of several equivalent mechanical forms, but, for the purpose of illustration, includes an inlet valve 22 and an outlet valve 23. Both of these valves are shown as being two-way rotary valves, but they may be any other equivalent type, such as those having reciprocating valve plugs and stems capable of being remotely controlled by electrical solenoid actuating means (not shown). The rotary valves 22 and 23 also are capable of being remotely controlled by any suitable mechanical or electrical actuating means (not shown).

Inlet valve 22 comprises a cylindrical casing 24 and a valve member 25 mounted therein for oscillation between open and closed positions. Valve casing 24 has an inlet port 26 and a diametrically aligned outlet port 27. Valve member 25 has a diametrically arranged straight channel 28 adapted to be adjusted between the closed position crosswise to the axis of ports 26 and 27 shown in Figs. 1 and 5 and the open position shown in Fig. 6, wherein channel 28 is in registration with ports 26 and 27. Inlet port 26 is communicatively connected to inlet conduit 20 and outlet port 27 is communicatively connected to a branch duct 29 which leads to outlet valve 23. Branch duct 29 is connected communicatively by a connecting duct 30 to second upstream manifold 17.

Outlet valve 23 comprises a cylindrical casing 31 and a valve member 32 mounted therein for oscillation between a first position represented in Figs. 1 and 6 and a second position represented in Fig. 5. Valve casing 31 has a first inlet port 33 and a second inlet port 34 that are in diametrical alignment and an outlet port 35 arranged circumferentially at 90 degrees separation from said inlet ports. The respective first and second inlet ports 33 and 34 are respectively connected communicatively with branch duct 29 and a return duct 36 which is in communication with common downstream manifold 19. Outlet port 35 is in communication with outlet conduit 21. Valve member 32 has a channel 37 that has radial portions arranged substantially at right angles to each other so that, in the previously mentioned first position of said valve member, channel 37 will communcatively interconnect second inlet port 34 and outlet port 35 to permit coolant fluid to return directly from common downstream manifold 19 to outlet conduit 21. In the alternative second position of valve member 32 represented in Fig. 5, channel 37 of valve member 32 will interconnect first inlet port 33 and outlet port 35 to permit coolant fluid to return from second upstream manifold 17 to outlet conduit 21.

The operation of the coolant passageways area controlling or regulating means will now be described.

Fig. 1 represents the adjusted condition of the selector valve means for low thrust operation of a variable thrust engine, wherein the coolant passageways area is reduced. In this condition, inlet valve 22 is in closed position and outlet valve 23 is in its first position. Consequently, coolant fluid will be directed from inlet conduit 20 through first upstream manifold 15 and the first set of passageways 13 only downstreamwardly to common downstream manifold 19 and thence through return duct 36 and outlet valve 23 to outlet conduit 21. (See arrows.) In this low thrust operation, for which the geometry of said first set of passageways 13 is purposely designed, the jacket pressure drop will be 30 p.s.i. for example, as indicated in the table appearing hereinbefore in the preamble.

Fig. 6 represents the adjusted condition of the selector valve means for intermediate or high thrust operation, wherein outlet valve 23 remains in its first position and inlet valve 22 is set in open position to direct coolant fluid into both upstream manifolds 15 and 17. As a result, coolant fluid will flow downstreamwardly through the second set of passageways 14 as well as the first set of passageways 13, thereby increasing the overall area to a maximum. Assuming that there are as many second passageways 14 as first passageways 13, the area will be doubled. It is to be understood that the ratio of the number of second passageways 14 (those in communication with the second upstream manifold) to the number of first passageways 13 (those in communication with first upstream manifold) may be modified as desired in practice.

In accordance with my invention the following new table can be constructed based on the following sample calculations.

| | Flow Rate | Jacket Pressure Drop |
|---|---|---|
| | | p.s.i. |
| Low Thrust | $W_1$#/sec. $(1 \times W_1)$ | 30 |
| Intermediate Thrust | $W_2$#/sec. $(2 \times W_1)$ | 30 |
| Hight Thrust | $W_3$#/sec. $(3 \times W_1)$ | 68 |

In the case as illustrated in Fig. 1, a flow rate, $W_1$, exists with a given passageway area. This is the low thrust operation level in the table above. The area involved here is only that area of one set of passageways. The corresponding pressure drop for purposes of illustration is 30 p.s.i. as given above. At the intermediate thrust level, the flow rate is now doubled or 2 times $W_1$. But the area is also doubled since coolant is now flowing through both sets of passageways. Hence the pressure drop will remain essentially the same as before.

At the high thrust level of engine operation, the area remains the same as for the intermediate level since coolant again flows through both sets of passageways. If now for illustration the flow rate is trebled over the low thrust operation, and since flow rate, W, is proportional to the square root of the pressure drop, $\Delta P$, the flowing calculation of jacket pressure drop is applicable to the high thrust operation in accordance with my discovery:

$$\frac{W_3^2}{W_2^2} = \frac{\Delta P_3}{\Delta P_2}$$

or $$\Delta P_3 = \frac{W_3^2}{W_2^2} \times \Delta P_2$$

Replacing the symbols with their assigned values from the table gives:

$\Delta P_3 = 68$ p.s.i. approximately

Therefore a saving of more than 200 p.s.i. over non-variable coolant passageway geometry for thrust variation of only 3:1 is achieved. This saving becomes much more significant when thrust variation is increased to a range of 5:1 or thereabouts.

The arrangement illustrated in Fig. 5 is an alternate configuration for intermediate thrust operation wherein heat transfer considerations make it advisable to lengthen the coolant flow path even though pressure drop due to the lengthening thereof is increased thereby. In the configuration of Fig. 5 inlet valve 22 is set in closed position and outlet valve 23 is in its second position. In this instance, coolant fluid will be directed through the first set of passageways 13 to common downstream manifold 19 in a first-pass and will return in a second-pass to the upstream end of thrust chamber 10 through the second set of passageways 14 before passing to outlet conduit 21 through outlet valve 23.

While there have been shown and described and pointed out the fundamental novel features of this invention as applied to a single structural embodiment and method of production, it will be understood that various omissions and substitutions and changes in the form and details of the device illustrated and its operation and in the steps of the method may be made by those skilled in the art without departing from the spirit of the invention. It is the intention, therefore, to be limited only as indicated by the scope of the following claims.

I claim:

1. A coolant-jacketed thrust chamber for jet propulsion devices comprising: a chamber wall having upstream and downstream ends and being provided with plural longitudinal coolant passageways including a first set of passageways and a distinct second set of passageways; a pair of annular circumferentially extending manifolds located substantially at the upstream end of the chamber wall and including a first upstream manifold in communication with said first set of coolant passageways and a second upstream manifold in communication with said second set of coolant passageways; respective coolant inlet and outlet conduit means; a common annular circumferentially extending manifold located substantially at the downstream end of the chamber wall and being in communication with both of said first and second sets of coolant passageways; a return duct means in communication with said downstream manifold and leading toward said coolant outlet conduit means; said coolant inlet means being in permanently open communication with said first upstream manifold; inlet selector valve means including a valve casing having inlet and outlet ports and a valve member in said casing movable between open and closed positions and having a channel constructed and arranged to interconnect said inlet and outlet ports in the open position of said valve member and to block communication therebetween in its closed position, the inlet port of said inlet valve casing being in communication with the coolant inlet conduit means; outlet selector valve means including a valve casing having respective first and second inlet ports and an outlet port permanently communicating with the coolant outlet conduit means, and a valve member movable between a first position and a second position in said casing and having a channel constructed and arranged to alternately interconnect said second inlet port and said outlet port in the first position of said valve and interconnect said first inlet port and said outlet port in the second position thereof, the second inlet port of said outlet selector valve means casing being in permanent communication with the return duct means of the downstream manifold; a branch duct communicatively connecting the outlet port of the inlet valve means to the first inlet port of the outlet valve means; and a connecting duct communicatively permanently interconnecting said branch duct and the second upstream manifold; whereby, in a first selector valve condition wherein the inlet selector valve means is closed and the outlet selector valve member is in its first position coolant fluid will be caused to flow downstreamward through the first set of coolant passageways only for low thrust operation, in a second selector valve condition wherein the inlet selector valve means is open and the outlet selector valve member is in its first position coolant fluid will be caused to flow downstreamward in both sets of coolant passageways for high thrust operation, and in a third selector valve condition wherein the inlet selector valve means is closed and the outlet valve member is in its second position coolant fluid will be caused to flow downstreamward in the first set of coolant passageways and upstreamward in the second set of passageways for intermediate thrust operation.

2. A coolant-jacketed thrust chamber as defined in claim 1, wherein the respective first and second coolant passageways alternate in position circumferentially around the chamber wall.

References Cited in the file of this patent

UNITED STATES PATENTS

| | | |
|---|---|---|
| 1,935,659 | Noack | Nov. 21, 1933 |
| 2,844,939 | Schultz | July 29, 1958 |